United States Patent
Mori et al.

(10) Patent No.: US 6,286,898 B1
(45) Date of Patent: Sep. 11, 2001

(54) VEHICLE SUNROOF WITH WEATHERSTRIP MOUNTING FLANGE

(75) Inventors: Eiji Mori; Shuji Matsuyama; Masashi Oka; Akira Shikada, all of Georgetown, KY (US)

(73) Assignee: Vuteq Corporation, Georgetown, KY (US)

( * ) Notice: Subject to any disclaimer, the term of this patent is extended or adjusted under 35 U.S.C. 154(b) by 0 days.

(21) Appl. No.: 09/636,373

(22) Filed: Aug. 11, 2000

(51) Int. Cl.[7] .................. B60J 7/00; B60J 10/12
(52) U.S. Cl. ..................... 296/216.09; 49/489.1
(58) Field of Search ............... 296/218, 216.06–206.09, 296/221–223, 146.15; 49/480.1, 489.1, 498.1

(56) References Cited

U.S. PATENT DOCUMENTS

| | | | |
|---|---|---|---|
| 3,381,988 | * | 5/1968 | Dewar .................. 49/489.1 |
| 3,903,224 | * | 9/1975 | Billiu . |
| 3,972,558 | * | 8/1976 | Horn . |
| 4,113,303 | * | 9/1978 | Yench ............... 296/218 X |
| 4,337,975 | * | 7/1982 | Tamamushi ......... 296/218 X |
| 4,351,560 | * | 9/1982 | Kanou et al. . |
| 4,513,548 | * | 4/1985 | Parker . |
| 4,585,269 | * | 4/1986 | Livesley . |
| 4,607,877 | * | 8/1986 | Shelton . |
| 4,616,456 | * | 10/1986 | Parker . |
| 4,676,493 | * | 6/1987 | Helbig . |
| 4,738,482 | * | 4/1988 | Böhm et al. . |
| 4,765,677 | * | 8/1988 | Nagata . |
| 4,783,116 | * | 11/1988 | Hough . |
| 4,805,958 | * | 2/1989 | Nagata . |
| 4,815,194 | * | 3/1989 | Lievesley . |
| 4,925,237 | * | 5/1990 | Böhn et al. . |
| 5,050,928 | * | 9/1991 | Böhm et al. . |
| 5,154,481 | * | 10/1992 | Paetz et al. ........... 296/211 |
| 5,251,954 | * | 10/1993 | Vande Kopple et al. . |
| 5,409,290 | * | 4/1995 | Grimm et al. . |
| 5,664,827 | * | 9/1997 | Mori et al. ........ 296/216.08 X |
| 5,669,657 | * | 9/1997 | Miyazawa . |
| 5,763,050 | * | 6/1998 | Hirmer . |
| 5,882,066 | * | 3/1999 | Schönebeck . |

FOREIGN PATENT DOCUMENTS

| | | | | |
|---|---|---|---|---|
| 735233 | * | 8/1955 | (GB) .................. 49/489.1 |
| 410215622 | * | 8/1989 | (JP) .................. 296/216.09 |

* cited by examiner

*Primary Examiner*—Dennis H. Pedder
(74) *Attorney, Agent, or Firm*—Harness, Dickey & Pierce, P.L.C.

(57) ABSTRACT

A sunroof panel structure for substantially closing a sunroof aperture in a vehicle. The sunroof panel structure includes a sunroof panel member having a plurality of edges and a weatherstrip mounting flange. The weatherstrip mounting flange and the sunroof panel member are unitarily formed such that the weatherstrip mounting flange is coupled to at least one of the plurality of edges. The weatherstrip mounting flange is configured to receive a weatherstrip seal member without the use of adhesives or other bonding agents or mechanisms. A method for forming a sunroof assembly for an automotive vehicle is also provided.

20 Claims, 2 Drawing Sheets

VEHICLE SUNROOF WITH WEATHERSTRIP MOUNTING FLANGE

TECHNICAL FIELD

The present invention relates generally to sunroof assemblies for motor vehicles and more particularly to a vehicle sunroof structure having an integral weatherstrip mounting flange.

BACKGROUND OF THE INVENTION

Background Art

Numerous sunroof assemblies have been developed that employ a weatherstrip holder to retain a resilient weatherstrip to the perimeter of a sunroof panel. The devices shown in FIGS. 1A and 1B are illustrative of the known arrangements in that they include a weatherstrip holder 2 which is bonded to the sunroof panel 4. The weatherstrip holder 2 typically includes a lip 6 which is spaced apart from the sunroof panel 4 and which terminates at a barb 8. The lip 6 and the barb 8 are configured to securely engage an attachment groove 10 formed in a weatherstrip 12 to thereby permit the weatherstrip 12 to be fixedly coupled to the sunroof panel 4.

While such arrangements permit the generation of an effective seal around the perimeter of the sunroof panel, several drawbacks have been noted with these arrangements. One of the significant drawbacks concerns the cost of these arrangements. The tooling and labor associated with the fabricating and bonding of the weatherstrip holder to the sunroof panel often represents a significant portion of the overall cost of a sunroof assembly.

Another drawback concerns the fact that the use of a separate weatherstrip holder creates an additional joint (i.e., the joint between the weatherstrip holder and the sunroof panel) which, if the bond between the sunroof panel and the weatherstrip holder fails, presents a path through which water and noise could infiltrate the vehicle passenger compartment. While failures of the bond between the weatherstrip holder and the sunroof panel are relatively rare, they are extremely difficult to detect due to the fact that the integrity of such joints is usually established through a destructive test wherein the bonded weatherstrip holder is physically removed from the sunroof panel.

Accordingly, there remains a need in the art for a sunroof assembly having a sunroof panel structure with an integrally formed weatherstrip mounting flange which permits the overall cost of the sunroof assembly to be reduced and which improves the integrity of the seal between the sunroof panel structure and a vehicle body.

SUMMARY OF THE INVENTION

It is one object of the present invention to provide a sunroof panel structure having an integrally formed weatherstrip mounting flange.

It is another object of the present invention to provide a method for forming a sunroof panel structure having an integrally formed weatherstrip mounting flange.

In one preferred form, the present invention provides a sunroof panel structure for substantially closing a sunroof aperture in a vehicle. The sunroof panel structure includes a sunroof panel member having a plurality of edges or sides and a weatherstrip mounting flange. The weatherstrip mounting flange and the sunroof panel member are unitarily formed such that the weatherstrip mounting flange is coupled to or forms at least one of the plurality of edges. The weatherstrip mounting flange is configured to receive a weatherstrip seal a member without the use of adhesives or other bonding agents or mechanisms. A method for forming a sunroof assembly for an automotive vehicle is also provided.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1A:
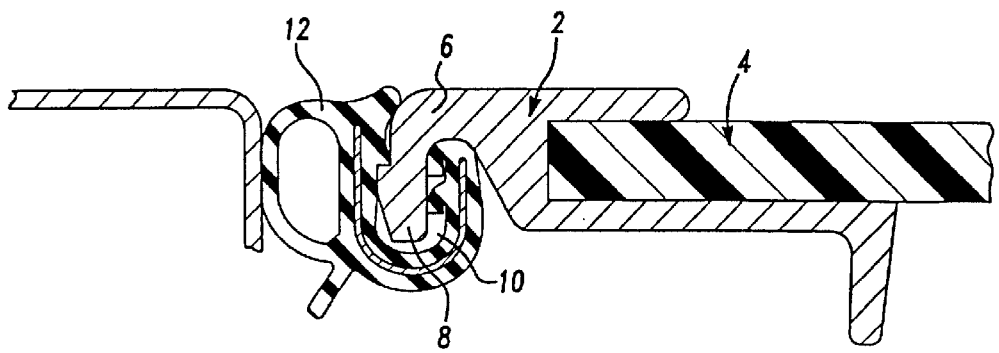
FIGS. 1A and 1B are cross-sectional views of a sunroof assembly constructed in accordance with the teachings of the prior art.
Figure 1B:
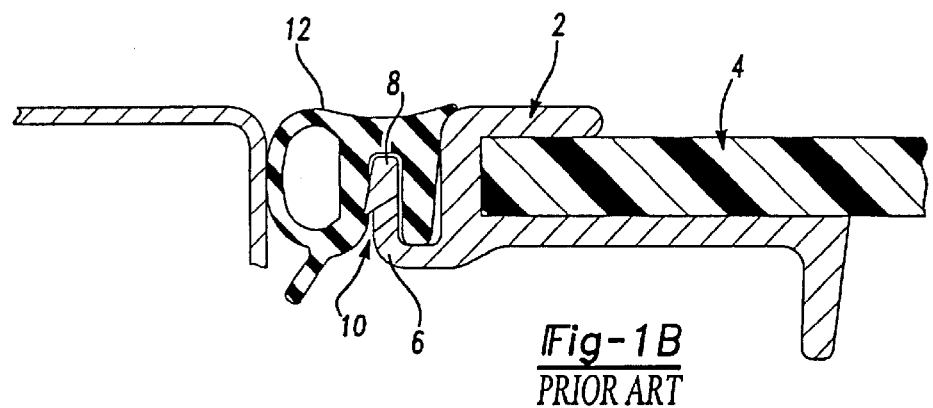
Figure 2:
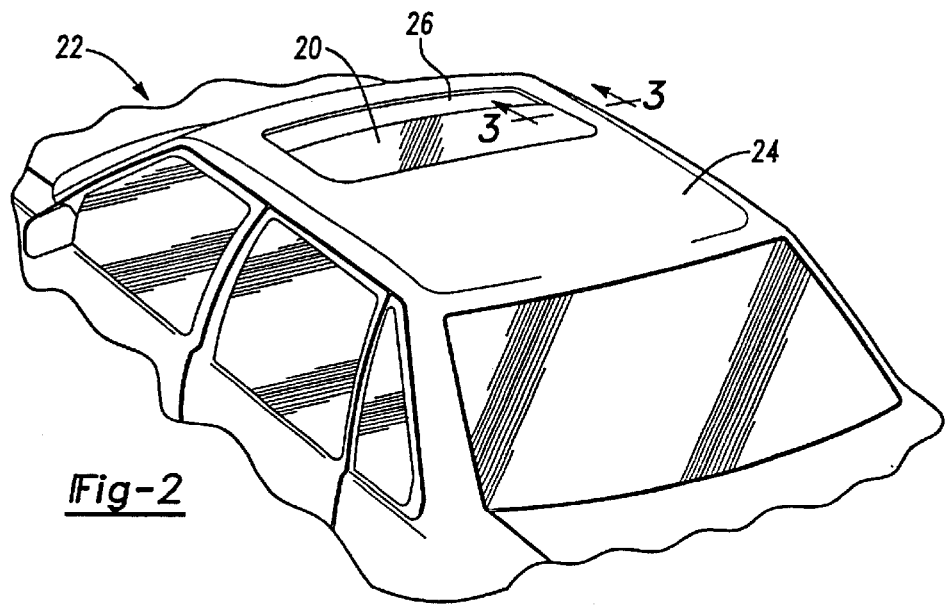
FIG. 2 is a perspective view of a vehicle sunroof assembly constructed in accordance with the teachings of the present invention and illustrated to be operatively associated with a motor vehicle.
Figure 3:
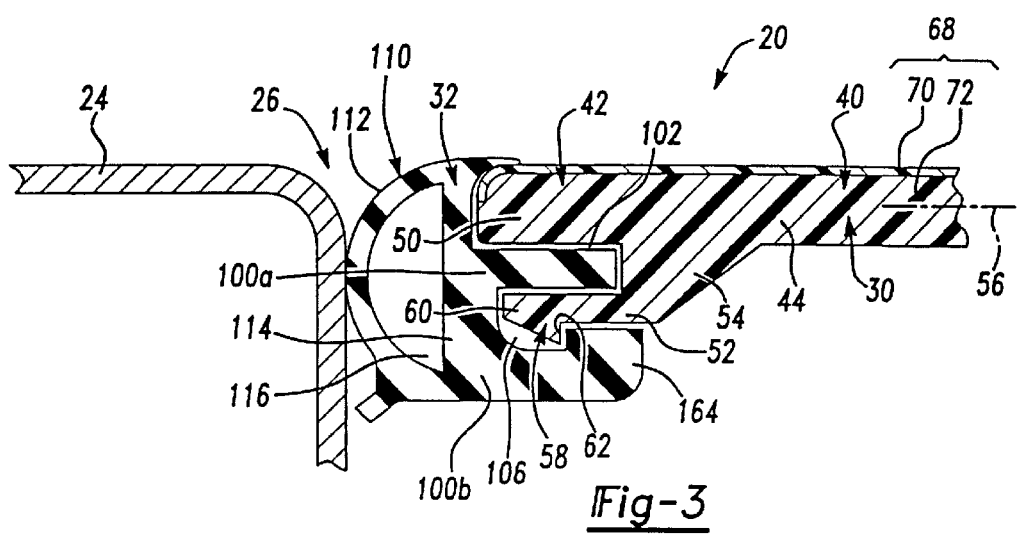
FIG. 3 is a cross-sectional view taken along the line 3—3.

With reference to FIG. 2 of the drawings, a vehicle sunroof assembly constructed in accordance with a preferred embodiment of the present invention is generally indicated by reference numeral 20. Sunroof assembly 20 is illustrated in operative association with an automotive vehicle 22 having a vehicle body 24 that defines a sunroof aperture 26. With additional reference to FIG. 3, sunroof assembly 20 includes a sunroof panel structure 30 and a weatherstrip seal member 32 which are coupled to vehicle body 24 and slidable between a first position wherein sunroof assembly 20 substantially closes sunroof aperture 26 and a second position wherein sunroof assembly substantially clears sunroof aperture 26.

Sunroof panel structure 30 includes a generally flat sunroof panel member 40 and a weatherstrip mounting flange 42. Sunroof panel member 40 and weatherstrip mounting flange 42 are unitarily formed so as to eliminate the need for a bonded joint formed therebetween which would be susceptible to leakage if the bonded joint were to fail. Sunroof panel member 40 is configured to conform to the roof profile of vehicle 22 when sunroof assembly 20 is positioned in the first position. Sunroof panel member 40 includes a plurality of edges or sides 44 to which weatherstrip mounting flange 42 is fixedly coupled or formed.

In the particular embodiment illustrated, weatherstrip mounting flange 42 includes first and second spaced apart furcations 50 and 52, respectively, and a gusset 54. First and second furcations 50 and 52 are arranged generally parallel to a longitudinal axis 56 of sunroof panel member 40. First furcation 50 extends laterally from edge 44 and has a thickness which is approximately the same as that of sunroof panel member 40. Second furcation 52 is spaced vertically downwardly from first furcation 50 and extends outwardly from edge 44 parallel to first furcation 50. Second furcation 52 terminates at its distal end at a barb structure 58 having a tapered nose 60. The proximal end of barb structure 58 is formed generally perpendicularly to the longitudinal axis 56 of sunroof panel member 40 to thereby create an engagement lip 62. Gusset 54 couples second furcation 52 to sunroof panel member 40 to thereby strengthen and support weatherstrip mounting flange 42.

Sunroof panel structure 40 is preferably formed in a mold from a clear or tinted plastic material. More preferably, the plastic material from which sunroof panel structure 40 is fabricated is a composite plastic 68 having a film member 70 and a plastic substrate 72. Film member 70 is preferably formed from a material which provides sunroof panel structure 40 with a relatively high resistance to scratching and/or degradation from ultra-violet radiation. Plastic substrate 72 is preferably formed from a thermoplastic material.

Figure 4:
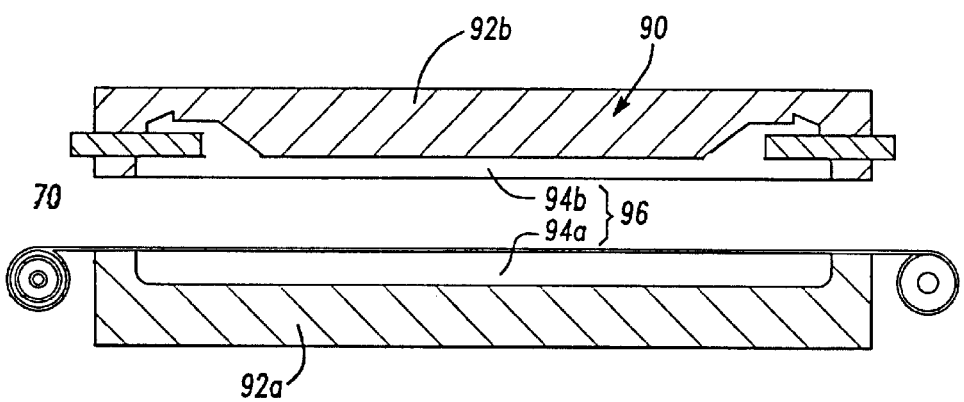
FIG. 4 is a cross-sectional view of a portion of a mold tool for forming the sunroof panel structure.

In FIG. 4, a mold 90 having a first mold component 92a and a second mold component 92b is provided for forming sunroof panel structure 40. Each of the first and second mold components 92a and 92b includes a mold cavity portion 94 which, when the mold components are clamped or pressed together collectively form a mold cavity 96 that defines the sunroof panel structure 30. The film member 70 is applied to the surface of the mold cavity portion 94a of a first mold component 92a as this surface corresponds to the outer surface of sunroof panel structure 40. Second mold component 92b is mated to the first mold component 92a and the plastic substrate 72 is injected into the mold cavity 96 while the plastic substrate 72 is in a molten state. The film member 70 and the plastic substrate 72 are bonded to one another during the molding process. Once removed from the mold cavity 96, the sunroof panel structures 40 are placed in cooling jigs (not shown) so as to prevent them from distorting while they cool. Once sunroof panel structures 40 are sufficiently cooled, weatherstrip seal member 32 and other hardware (not shown) are assembled thereto.

Returning to FIG. 3, weatherstrip seal member 32 includes a pair of spaced apart wall members 100 which confront the opposite sides of second furcation 52. In the particular embodiment illustrated, one of the wall members 100a is a coupling flange which is at least partially disposed within a groove 102 formed between the first and second furcations 50 and 52. The other wall member 100b includes a flange member 104 for contacting the engagement lip 62 of the barb structure 58 to inhibit the barb structure 58 from being withdrawn from a barb aperture 106 defined by the pair of wall members 100.

Weatherstrip seal member 32 is preferably formed from a resilient material and includes a seal bead portion 110 having an arcuate outer wall member 112 and a backing wall member 114. Outer wall member 112 and backing wall member 114 cooperating to define a seal bead aperture 116 which permits seal bead portion 110 to readily compress to form a high quality seal against vehicle body 24.

Figure 5:
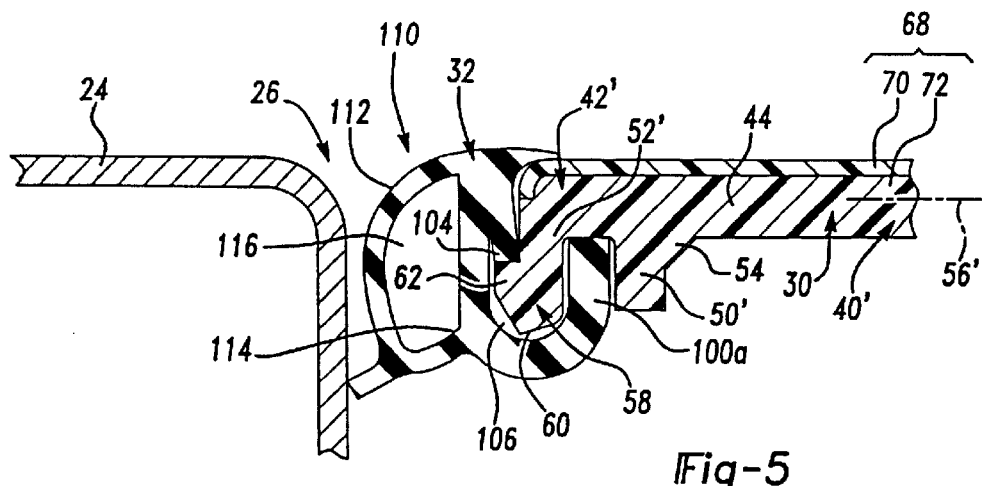
FIG. 5 is a cross-sectional view similar to that of FIG. 3 but illustrating an alternate embodiment of the weather strip mounting flange.

While the sunroof panel structure 40 has been described thus far as including first and second furcations 50 and 52 which are oriented parallel to the longitudinal axis of the sunroof panel member 40, those skilled in the art will appreciate that the invention, in its broader aspects, may be constructed somewhat differently. For example, the first and second furcations 50' and 52' may be oriented perpendicular to the longitudinal axis 56' of the sunroof panel member 40' as shown in FIG. 5. Configuration of weatherstrip mounting flange 42' in this manner is advantageous in that the tooling for fabricating sunroof panel structure 30' is simpler in its configuration and less expensive. Those skilled in the art will understand that all other features of sunroof panel structure 40' are substantially identical to the features of sunroof panel 40 shown in FIG. 3.

Accordingly, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A one-piece sunroof panel structure for substantially closing a sunroof aperture in a vehicle, the sunroof panel structure comprising a sunroof panel member and a weatherstrip mounting flange, the sunroof panel member having an outer surface, which is adapted to form a portion of an exterior surface of the automotive vehicle, an inner surface disposed opposite the outer surface, and a plurality of edges, the weatherstrip mounting flange being formed in one piece with the panel member along at least one of the plurality of edges and including a pair of spaced-apart furcations that cooperate to form a weatherstrip groove therebetween, each of the furcations being arranged generally parallel to said outer surface, a first one of the furcations terminating on a side opposite the weatherstrip groove in a second plane that is generally coincident with the outer surface of the sunroof panel.

2. The sunroof panel structure of claim 1, wherein a second one of the furcations is spaced apart from the inner surface of the sunroof panel.

3. The sunroof panel structure of claim 2, wherein the weatherstrip mounting flange further includes a gusset coupled to the second one of the furcations and the sunroof panel.

4. The sunroof panel structure of claim 1, wherein at least one of the furcations includes a barb structure that is adapted to engaging a weatherstrip seal and inhibiting the weatherstrip seal from being withdrawn from the weatherstrip mounting flange.

5. The sunroof panel structure of claim 4, wherein the barb structure includes a tapered nose portion.

6. The sunroof panel structure of claim 1, wherein the sunroof panel member is formed from plastic.

7. The sunroof panel structure of claim 6, wherein the sunroof panel member is formed from a plastic composite, the plastic composite having a film member and a plastic substrate member.

8. The sunroof panel structure of claim 7, wherein the film member is resistant to scratching and degradation from ultra-violet radiation.

9. A sunroof assembly for an automotive vehicle having a vehicle body that defines a sunroof aperture, the sunroof assembly comprising:

a one-piece sunroof panel structure having a sunroof panel member and a weatherstrip mounting flange, the sunroof panel member having an outer surface, which is adapted to form a portion of an exterior surface of the automotive vehicle, an inner surface disposed opposite the outer surface, and a plurality of edges, the weatherstrip mounting flange formed along at least one of the plurality of edges and including a pair of spaced-apart furcations and a gusset, the furcations cooperating to form a weatherstrip groove therebetween, each of the furcations being arranged generally parallel to said outer surface, a first one of the furcations being spaced apart from the inner surface of the sunroof panel, the gusset being coupled to the first one of the furcations and the sunroof panel such that the weatherstrip mounting flange is relatively thicker than the sunroof panel; and a weatherstrip seal coupled to the weatherstrip mounting flange, the weatherstrip seal having a wall member that is disposed in the weatherstrip groove.

10. The sunroof assembly of claim 9, wherein at least one of the furcations includes a barb structure for engaging the weatherstrip seal and inhibiting the weatherstrip seal from being withdrawn from the weatherstrip mounting flange.

11. The sunroof assembly of claim 10, wherein the barb structure includes a tapered nose portion.

12. The sunroof assembly of claim 9, wherein the sunroof panel member is formed from plastic.

13. The sunroof assembly of claim 12, wherein the sunroof panel member is formed from a plastic composite, the plastic composite having a film member and a plastic substrate member.

14. The sunroof assembly of claim 13, wherein the film member is resistant to scratching and degradation from ultra-violet radiation.

15. A sunroof assembly for an automotive vehicle having a vehicle body that defines a sunroof aperture, the sunroof assembly comprising:

a one-piece sunroof panel structure having a sunroof panel member and a weatherstrip mounting flange, the sunroof panel member having an outer surface, which is adapted to form a portion of an exterior surface of the automotive vehicle, an inner surface disposed opposite the outer surface, and a plurality of edges, the weatherstrip mounting flange formed along at least one of the plurality of edges and including a pair of spaced-apart furcations that cooperate to form a weatherstrip groove therebetween, each of the furcations being arranged generally parallel to said outer surface, a first one of the furcations terminating on a side opposite the weatherstrip groove in a second plane that is generally coincident with the outer surface of the sunroof panel; and a weatherstrip seal coupled to the weatherstrip mounting flange, the weatherstrip seal having a wall member that is disposed in the weatherstrip groove.

16. The sunroof assembly of claim 15, wherein a second one of the furcations is spaced apart from the inner surface of the sunroof panel.

17. The sunroof assembly of claim 16, wherein the weatherstrip mounting flange further includes a gusset coupled to the second one of the furcations and the sunroof panel.

18. The sunroof assembly of claim 15, wherein at least one of the furcations includes a barb structure for engaging the weatherstrip seal and inhibiting the weatherstrip seal from being withdrawn from the weatherstrip mounting flange.

19. The sunroof assembly of claim 18, wherein the barb structure includes a tapered nose portion.

20. The sunroof assembly of claim 15, wherein the sunroof panel member is formed from a plastic composite, the plastic composite having a film member and a plastic substrate member.

* * * * *